United States Patent [19]

Lechner et al.

[11] Patent Number: 4,531,271
[45] Date of Patent: * Jul. 30, 1985

[54] METHOD FOR MANUFACTURING A ROTATIONALLY SYMMETRICAL CONSTRUCTION PART

[75] Inventors: Manfred Lechner, Munich; Kurt Stich, Unterhaching, both of Fed. Rep. of Germany

[73] Assignee: Messerschmitt-Bolkow-Blohm GmbH, Fed. Rep. of Germany

[*] Notice: The portion of the term of this patent subsequent to Apr. 10, 1996 has been disclaimed.

[21] Appl. No.: 159,385

[22] Filed: Jun. 13, 1980

Related U.S. Application Data

[60] Division of Ser. No. 41,249, May 21, 1979, abandoned, which is a continuation-in-part of Ser. No. 854,317, Nov. 23, 1977, abandoned, which is a continuation of Ser. No. 683,651, May 6, 1976, abandoned.

[30] Foreign Application Priority Data

May 22, 1975 [DE] Fed. Rep. of Germany ....... 2522681

[51] Int. Cl.³ .............................................. B23P 15/26
[52] U.S. Cl. .................................... 29/157 C; 72/136; 228/173.5; 228/213; 228/191; 228/173.4
[58] Field of Search ................ 29/157 C, 33 R, 33 F; 72/136, 137, 174, 189; 228/173 E, 173 F, 212, 213, 191

[56] References Cited

U.S. PATENT DOCUMENTS

| | | | |
|---|---|---|---|
| 1,802,161 | 4/1931 | Summers | 29/727 X |
| 3,039,707 | 6/1962 | Beck et al. | 242/7.16 |
| 3,095,156 | 6/1963 | Warnken | 242/7.21 |
| 3,162,012 | 12/1964 | Blaze et al. | 29/157 C X |
| 3,379,385 | 4/1968 | Osweiler | 242/7.22 |
| 4,148,121 | 4/1979 | Butler et al. | 29/157 C |

Primary Examiner—Kenneth J. Ramsey
Attorney, Agent, or Firm—McGlew and Tuttle

[57] ABSTRACT

An apparatus and method for fixedly positioning a rotationally symmetrical constructional part having an irregular longitudinal peripheral wall consisting of a plurality of spirally wound juxtaposed tubes. The apparatus comprises a rotatable core having a peripheral surface corresponding to the inner contour of the peripheral wall for supporting the tubes with means for rotating the core about the axis of symmetry. Clamping devices are included for fixedly positioning the ends of the tubes on the core. A wire wrapping device is positioned alongside the core for applying a removable temporary wire wrapping of non-circular wire cross-section under tensile stress to the surface of the tubes. The wrapping device includes guide devices for guiding the wire to the surface of the tubes in a plane substantially perpendicular to the axis of symmetry and for maintaining the wire under a selected tensile stress so that it is helically wound in successive contacting turns over the tubes, and a device for effecting a change in the elevation of the wire wrapping device depositing the wire on the tubes during heating of successive turns of the wire. The apparatus and method cause the successive contacting turns of wire to closely and forcefully apply against preceding turns of wire and against the tubes for forming the constructional part.

6 Claims, 4 Drawing Figures

METHOD FOR MANUFACTURING A ROTATIONALLY SYMMETRICAL CONSTRUCTION PART

This application is a divisional of now abandoned application Ser. No. 041,249 filed May 21, 1979, which itself was a continuation-in-part of abandoned application 854,317 filed Nov. 23, 1977, which itself was a continuation of abandoned application Ser. No. 683,651 filed May 6, 1976.

FIELD AND BACKGROUND OF THE INVENTION

This invention relates in general to apparatus and a method for manufacturing rotationally symmetrical constructional parts and, in particular, to a new and useful device and method for winding a wire of non-circular cross-section over a constructional part formed by spirally wound juxtaposed tubes, which are held on a conforming supporting cone, by feeding the wire substantially perpendicular to the axis of the constructional part and maintaining a tension on the wire so that the successive turns of the wire are in close juxtaposition.

The present invention is an improvement over a non-anticipating copending application, Ser. No. 717,693, which is the parent of a non-anticipating continuation-in-part Ser. No. 872,432, now U.S. Pat. No. 4,148,121. This application and patent are incorporated by reference in the present application to show details of common structure. In the aforementioned patent and application, the construction part comprises a plurality of juxtaposed spirally-wound tubes which, in the finished state, are welded or brazed, or otherwise connected to each other along their juxtaposed surfaces, the construction part decreasing in radius from a larger end to a smaller end. The tubes forming the constructional part are initially spirally wound, in juxtaposition with each other, on a bending device, and then the bunch of tubes is removed from the bending device. The tubes are then placed in a position on a conforming mounting core and clamped together by a wire winding which is fixed thereto by means of a plurality of soldering areas. The individual tubes are thus bunched together and clamped. They are interconnected, preferably by being welded to each other at their outside edges consecutively by sectors, for which purpose the wire wrapping is removed in advance, also by sectors.

The conforming mounting core, whose external peripheral surface conforms to the internal peripheral surface of the bunched tubes, does not form part of the finished constructional part, as the latter is constituted only by the interconnected spirally-wound juxtaposed tubes. The present invention is an improvement over this, and particularly in respect to an apparatus for insuring that even with a sharper curved contour of the constructional part to be manufactured, the bunched tubes are securely and firmly pressed into contact with the mounting device the wire winding up to the connecting operation without running the risk of misadjustments of the wire winding during the winding operation.

SUMMARY OF THE INVENTION

In accordance with the invention, temporary wrapping of the bunched tubes with a wire winding, is effected using wire which has a non-circular cross-section. When a circular wire is employed, it must have a relatively small diameter in order to achieve satisfactory conformability. This is true particularly if the three-dimensional shape of the constructional part to be manufactured has sharply diverging portions. With such an arrangement, the risk is run that, at the locations of the greatest pitch, a single turn of wire will be pressed out of its position during the winding operation by the force exerted by the following turn, and in consequence the entire wire wrapping will collapse and a new one will be required.

In the application of the inventive construction, on the contrary, due to the non-circular cross-section of the wire, the wire turns which are wound under tensile stress are secured against torsional motion and against a pressing action of the adjacent turns even at locations of greatest pitch, so that a uniformly accurate, full contact pressure of the bunched tubes against the mounting device which is conformable to the finished constructional part is insured and the wire winding operations becomes substantially simpler and faster than previously possible.

Advantageously, the wrapping wire has a quadrangular, preferably square cross-section, which is rounded at its corners, so that a flat contact of the wire turns, both on their underside with the bunched tubes and at their respective sides laterally with the adjacent turns, is obtained. With such a cross-section, after the winding operation, the wire wrapping is fixed in place by soldering at a plurality of locations.

In a particularly preferred embodiment, for obtaining an interengagement of the wire turns permitting the omission of a subsequent fixation by means of soldered areas, the sectional wire has a built-up cross-section which is the combination of two channel sections placed side-by-side in mutually inverted position and having a common middle leg, so that while the wire is wound on the bunch of tubes, the individual wire turns positively engage each other by the free outer legs of their cross-sections. In such a case, it is advisable to design the free legs of the channel sections with a back rake which is smaller than the angle of static friction. Such a cross-section insures an easy winding of successive turns of wire without the wire getting stuck to or climbing over a previous turn. At the same time, in addition to the axial anchorage, this shape provides a self-locking of the wire turns in the radial direction, and this considerably consolidates the firm interconnection of the wiring. Optionally or in addition, the middle leg and the two free legs of the built-up cross-section may extend in parallel in an oblique direction so that a radially acting additional, positive locking is obtained and consequently the stressability of the wire winding is further increased.

In order to obtain a high winding accuracy, the invention includes a guide mechanism for feeding the sectional wire substantially perpendicularly to the longitudinal axis of the mounting device. This perpendicular winding will be explained in greater detail later on in this application. The guide mechanism is advantageously displaceable parallel to the longitudinal axis of the mounting device or support, and this displacement is controllable by means of a measuring and regulating device which is responsive to the inclination of the wire between the guide mechanism and the support device for the article being wound. In a simple embodiment of the invention, the longitudinal axis of the mounting device is vertical and the measuring device comprises a water balance which is supported on the wire in a position before it is wound, by means of rope pulleys.

In order to insure a uniform winding, the invention provides a wire pull meter which monitors the winding tension. A cross-section forming device is provided which acts on the wire to form the wire into the desired cross section. The wire is advantageously drawn through the forming device by the rotation of the mounting device with the article being wound. This makes it possible to use circular wires as initial material for the winding operation, which are subsequently formed into a non-circular cross-section, and at the same time it produces a winding stress by the resistance to deformation of this wire during the shaping thereof to the desired cross-section. The section forming device comprises a set of rollers having a roller clearance therebetween which is variable, so that a variation of the tensile strength action on the wire and a control of the winding stress is effected. A brake may also be connected to a reel supply from which the wire is fed, to further control and vary the wire winding tension.

Accordingly, it is an object of the invention to provide an improved device for winding a continuous coil of wire around a rotationally symmetrical construction part which is mounted on its support and rotated while thereon, to draw off the wire from a reel supply and which includes means for forming the wire into a non-circular cross-section and for guiding the wire so that it feeds to the constructional part being wound at substantially right angles to the axis of the part and at elevations which vary continuously during the winding.

A further object of the invention is to provide a method for manufacturing a rotationally symmetrical construction part made of tubes which comprises positioning the part on a support with its axis aligned with the axis of rotation of the support by arranging the tubes in a spiral formation over the support, and clamping the ends of the tubes on the support, guiding a winding wire to the constructional part for winding over the tubes concentrically to the axis of the constructional part and to guide the wire at an angle substantially at right angles to the axis of the constructional part, and forming the wire during its feed so as to apply a tension on the wire and to provide a non-circular cross-sectional drive.

A further object of the invention is to provide an apparatus for manufacturing a rotationally symmetrical constructional part which is simple in design, rugged in construction and economical to manufacture.

For an understanding of the principles of the invention, reference is made to the following description of typical embodiments thereof as illustrated in the accompanying drawings.

GENERAL DESCRIPTION OF THE PREFERRED EMBODIMENTS

Figure 1:
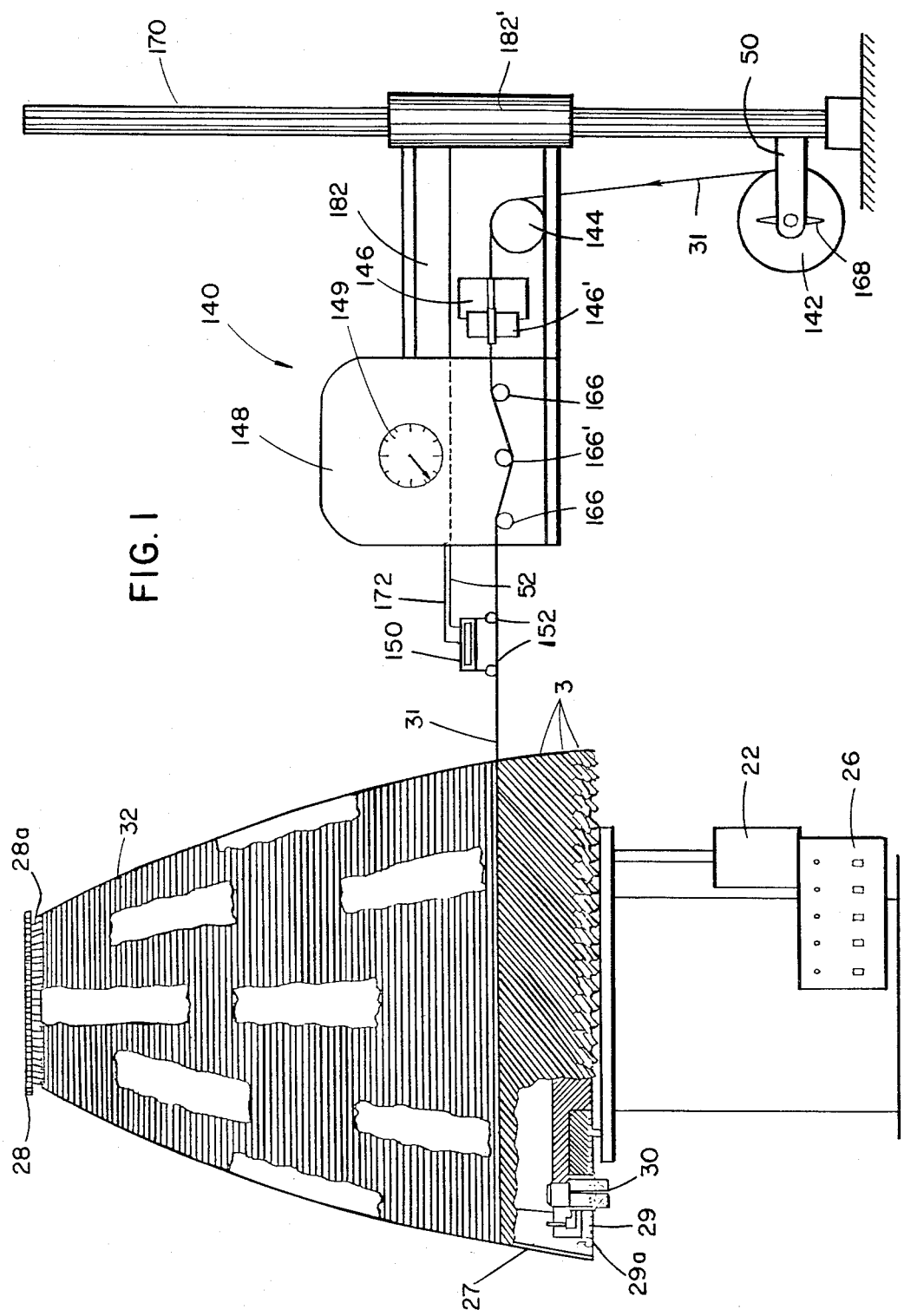
FIG. 1 is a side elevational view of a device for temporarily winding a wire wrapping around a rotationally symmetrical part, constructed in accordance with the invention.
Figure 2:
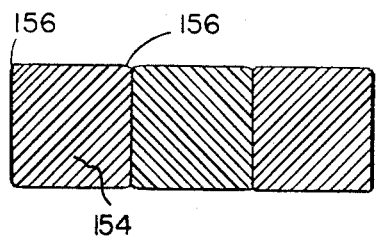
FIG. 2 is a partial sectional view of the wires which are wrapped on the constructional part indicating their cross-section and their juxtaposed positioning.

Referring to the drawings in particular, the invention embodied therein in FIGS. 1 and 2 comprises an apparatus, for manufacturing a rotationally symmetrical construction part, which includes a mounting device or support 27 having an outer contour which is substantially the same as the inner contour of the constructional part to be manufactured. Drive means including an electric motor 22 operated from a control panel 26 effects rotation of the core 27 about an axis A—A.

The mounting device includes a fixing disk 28 secured to the top of the mounting core 27, and provided with slots 28 for suspending spirally wound and bent tubes 3, which are positioned over the mounting core 27 and form the constructional part being manufactured. A fixing disk 28 is provided at the lower end of core 27 and includes slots 29a which receive the ends of the tubes 3 and hold them in position. The disk 29 is adapted to be tightened in a circumferential direction in order to apply a tension to the tubes 3 by rotating an eccentric part 30. In this tension state the whole assembly of bunched tubes 3 is provided with a wrapping in the form of a wire winding 31 which is wound thereon by means of a winding device generally designated 140, constructed in accordance with the invention. The winding device is arranged so that it feeds substantially perpendicular to the longitudinal axis of the mounting core 27. If necessary the winding, after having been wound on the tubes, is secured by a plurality of solder areas 32. When soldering is employed, the wire 31 is copper plated and during the winding operation an aluminum or brass foil is then placed at the locations of the soldering areas 32 between the tubes and the wire 31 wound thereon in order to prevent the tubes from being soiled by the flux during the soldering.

With regard to the wire feeding angle, the wire is fed substantially in a plane which is perpendicular to the axis of rotation of the mounting core, thus horizontally in FIG. 1. This is possible without causing the wire turns to roll onto each other since the wire turns are placed on the bunched tubes 3 with a certain lead angle. In practice this lead angle is almost zero and forms only a fraction of a degree of angle with the horizontal plane. This may be illustrated by an example. The thickness of the winding wire used is between 1.5 and 7.5 mm and the diameter of the mounting core 27 varies between 200 mm (at the tapered end) and 900 mm (at the bottom of the core). The lead angle of the wire turns already on the bunched tubes is thus less than 0.7°. This deflection is negligibly small and cannot be measured by means of conventional water balances which may be used with the invention as explained later. Consequently, if the direction in which the wire 31 is guided toward the mounting core before it is wound is to be exactly equal to the angle of lead of the wire turns which are already on the core, the wire must be fed substantially horizontally, i.e. in planes which are perpendicular to the axis of rotation of the mounting core. If, as an example, a wire having a square cross-section with rounded corners as shown in FIG. 2, is wound on the mounting core or bunched tubes, it is not even necessary for the wire feed direction to exactly coincide with the lead angle of the wire turns already on the mounting core. That is, since the wire is flexible, even with smaller deviations (about 1° to 2°), at the winding point, the side face of the wire to be wound slides over the adjacent side face of the preceding wire turn, so that the wire turns are closely pressed against each other, without any superposition. Only with a larger deviation of the wire feed direction from the horizontal, that is when the instantaneous winding point on mounting core 27 migrates too far below the level of the feeding device (i.e. front roller 166) of wire pull meter 148, there is a risk that the wound wire turns may be superimposed on a preceding turn on the mounting core. Before this would happen, however, the wire feed device is lowered as will later be described. Thus, due to the substantially horizontal feed of the wire and the very small deviation of this feed direction from the lead angle of the wire turns on the mounting core, an advantage is realized that during the wrapping of the mounting core, the wire turns are pressed into contact with each other forcefully, but are not superimposed. The lead angle for the first turn of the wire is originally established by a positioning of the wire at the top of the core with the constructional part thereon. The movement of the feeding device downwardly caused this lead angle to be maintained even with a perpendicular feed of the wire.

On completion of the wire wrapping the wire is removed again, consecutively be sectors and starting from the lower fixing disk 29, and the tubes in the sectors thus exposed are connected or permanently joined for example by welding, to each other and step by step at their adjacent outer edges. During this operation the winding stress in the remaining part of the wire wrapping is maintained, either by the applied solder areas 32 or by unwinding wire 31 under tensile stress. The apparatus for forming the constructional part made of tubes 3, thus includes the core 27, disks 28, 29 and wire wrapping 31.

Figure 3:
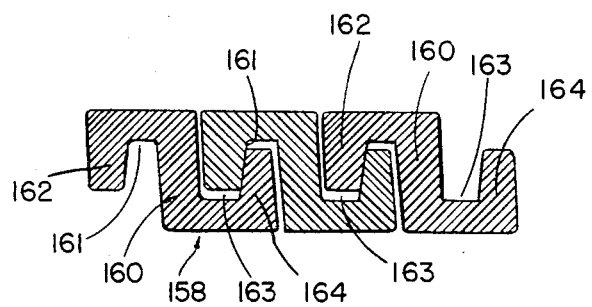
FIGS. 3 and 4 are views similar to FIG. 2 of other embodiments of the invention.
Figure 4:
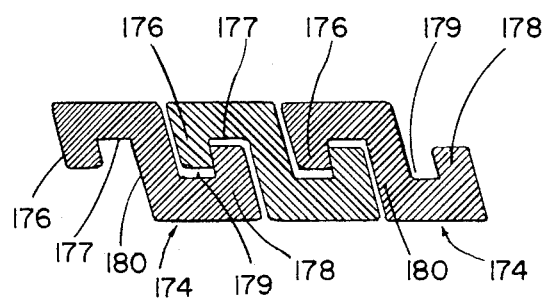

In accordance with the invention the winding or feeding device 140 comprises a supporting arm 182 which is arranged at right angles, that is horizontal to a vertical column 170 which extends parallel to the longitudinal axis A—A of the mounting core 27. The supporting arm includes a central portion or hub 182' which may, for example, include a drive motor 190 and a drive gear 191 engageable with a rack 192 on the column 170 in order to provide a shifting of the arm 182 in a vertical direction upwardly or downwardly along the column 170. The supply spool 142 for the winding wire is rotatably supported on an arm 50 at the lower end of the column and wire 31 is guided off the spool 142 onto a guide pulley 144 which is rotatably mounted at the inner end of the arm 182. The wire is guided through a cross-section forming device which comprises a pair of rollers 146 and 146' between which the wire is drawn and which act on the wire to shape it to a desired cross-section. The winding stress of the wire is controlled by manually or automatically varying the clearance between the rolls 146 and 146', and in addition by braking the delivery spool 142 by means of a set nut 168 which may be rotated to vary the frictional force engaging the reel on the support arm 50. Total wire tension is thus established by rollers 146, 146' alone, or with brake 168. Tension on the wire 31 is monitored by a wire pull meter 148 having an indicator dial 149. The meter 148 is mounted on the supporting arm 182 between the forming rolls 146' and 146, and the construction part being manufactured. The meter includes a plurality of oppositely acting deflection rolls 166 and 166'. The tension on the wire 31 is first increased by the value necessary to deform the winding wire through the rollers 146, 146', so that the final winding tension with which the wire is wound about mounting core 27 or the bunched tubes 3 corresponds to the sum of the braking effect of nut 168 and the deformation of the cross-section between rollers 146, 146'. The winding tension is controlled by adjusting nut 168 and rollers 146, 146'. The stronger nut 168 is tightened, the higher is the winding tension (indicated by the pull meter), with other conditions, particularly at the forming rollers, unchanged. On the other hand, however, the winding tension also depends on the extent of wire deformation between rollers 146, 146' and thus for a specific winding operation, on the respective selected cross-section of the wire. For example, if the cross-section according to FIG. 3 or 4 is selected instead of that of FIG. 2, the winding tension will change even with an unchanged adjustment of nut 168, and if this changed winding tension will correspond to the desired value, there is no need for moving adjusting nut 168.

The sectional wire 31 is wound on the tubes 3 starting from the narrow top end and proceeding toward the bottom larger end of the monitoring core 27, and it is fed to each of the respective turn or coil levels in a plane which extends substantially perpendicularly to the longitudinal axis of the mounting core and, in the embodiment illustrated, with the verically extending axis of rotation A—A of the mounting core 27, the wire is fed in a horizontal direction and wound as already explained. For this purpose, it is necessary during the winding operation to advance the supporting arm 182 continuously along the column 170. This displacement is controlled by means of a measuring device which comprises a water balance 150, which is responsive to the deviations of the angle of feed of the wire from the horizontal. The displacement also as mentioned, established the angle of the wire turns on the core. The balance 150 is supported on the section of wire 31 which is about to be bound by means of small rope pulleys 152 at a location between the mounting core and the wire pull meter. The device is indicated as being suspended on the wire pull meter 148 through an arm 172 which is hinged both to the water balance 150 and to the meter 148. An electrical connection, for example 52, extends from the water balance 150 to a suitable control in the motor 190 in order to shift the arm 182 in respect to the column 170. Use of this perpendicular feed to wind wire with use of the water balance is known to operate satisfactorily through actual experimentation experience of the inventors.

The wire 31 is advantageously of a rectangular or non-circular cross-section. As shown in FIG. 2, a wire 154 has a substantially square cross-section so that the individual wire turns are pressed against the subjacent bunch of tubes by the flat contact surfaces and brace each other laterally, also along the flat surfaces. In this case it is advisable to fix the wire wrapping by solder areas 32 in order to prevent a subsequent displacement of the individual wire turns. The square cross-section is rounded at corners 156 in order to permit easy winding and to prevent damage of the protective foil, which during the winding operation is placed between the wire winding and the bunched tubes 3. Instead of a square cross-section, any other section such as another quadrangular section such as a rectangular or a trapezoidal cross-section can be used. The section may be produced by the drawing roller 146 and 146'.

As already mentioned, the wire 31 is wound on the bunched tubes 3 only as a temporary wrapping and then removed again by sectors, in order to fix the individual tubes of the bunch during joining or welding. Thus, in the same way as mounting core 27 and fixing disks 28, 29, 30, the wire wrapping is intended to firmly position the bunched tubes and does not constitute any part of the finished constructional part.

In FIG. 3 a formed cross-section 158 is provided which comprises a combination of two channel sections which are inverted relative to each other and have a common middle leg 160 and free legs 162 and 164, which are turned in different directions. During the winding the free legs engage the respective recesses 161 and 163 of the next adjacent turn. To facilitate the winding process, the free legs 162 and 164 or recesses 161 and 163 are designed with a back rake or bevel flank respectively, but the angle of inclination is smaller than the angle of static friction, so that a mutual anchorage of the wire turns is unaffected by the action of the lateral tensile forces. Due to this positive mutual engagement of juxtaposed wire turns, the use of such cross-sectional wire makes it possible to dispense with the subsequent fixation of the wire wrapping with solder areas.

In the embodiment of FIG. 4, wire 31 has a formed cross-section 174 which is made of two oblique mutually inverted channel sections having a common middle leg 180 and free legs 176 and 178. All the legs are parallel to each other and free legs 178 and 176 are engaged in the respective recesses 177, 179 of the adjacent wire turns. Due to the oblique extension of the legs 176, 178, a radial positive engagement between the wire turns is obtained, in addition to lateral anchorage, so that the wire wrapping is further consolidated as is well known with structures having similar cross-section. This particular design for the wire is not intended for producing a removable wire wrapping for mounting purposes as with the other forms, but for constructing an integral wall of wire turns which are brazed throughout or welded to each other and which in all may serve as an outer wall of a rocket combustion chamber.

While specific embodiments of the invention have been shown and described in detail to illustrate the application of the principles of the invention, it will be understood that the invention may be embodied otherwise without departing from such principles.

What is claimed is:

1. A method of forming a rotationally symmetrical constructional part having an irregular longitudinal peripheral wall consisting of a plurality of juxtaposed tubes (3) which are arranged side-by-side and spirally wound about the axis of symmetry of the constructional part comprising the steps of:
    rigidly mounting the constructional part to a mounting core (27) which has an outer periphery conforming to the inner surface of the constructional part;
    forming a wire (31) into a non-circular cross-section having substantially parallel opposite flat side contact surfaces;
    rotating the constructional part;
    wrapping the constructional part as it rotates, tightly with the wire so that an opposite flat side contact surface of the wire in one turn of the wrapping firmly slides into substantially parallel engagement with an opposite flat side contact surface of the wire in a previous turn of the wrapping on the constructional part;
    feeding the wire which is being wrapped on the constructional part substantially perpendicularly to the axis of symmetry of the constructional part;
    thereafter removing the wire from the constructional part section by section to expose the tubes;
    permanently joining the exposed tubes to each other in the exposed sections; and forming said wire with a quadrangular cross-section having said opposite flat side contact surfaces.

2. A method of forming a rotationally symmetrical constructional part having an irregular longitudinal peripheral wall consisting of a plurality of juxtaposed tubes (3) which are arranged side-by-side and spirally wound about the axis of symmetry of the constructional part comprising the steps of:
    rigidly mounting the constructional part to a mounting core (27) which has an outer periphery conforming to the inner surface of the constructional part;
    forming a wire (31) into a non-circular cross-section having substantially parallel opposite flat side contact surfaces;
    rotating the constructional part;
    wrapping the constructional part as it rotates, tightly with the wire so that an opposite flat side contact surface of the wire in one turn of the wrapping firmly slides into substantially parallel engagement with an opposite flat side contact surface of the wire in a previous turn of the wrapping on the constructional part;
    feeding the wire which is being wrapped on the constructional part substantially perpendicularly to the axis of symmetry of the constructional part;
    thereafter removing the wire from the constructional part section by section to expose the tubes;
    permanently joining the exposed tubes to each other in the exposed sections; and
    forming said wire with a double channel cross-section having a common channel leg and outer end portions with channel legs extending in respective opposite directions;
    said wrapping step including interlocking adjacent turns of said wire onto said constructional part during the winding step by engaging the channel leg of the wire in the recess formed on a preceding wire turn.

3. A method according to claim 1 or 2, further including drawing the wire by the rotation of the constructional part.

4. A method according to claim 1 or 2, further including the steps of temporarily soldering the wrapped wire at random spaced intervals to positively position them on the constructional part.

5. A method according to claim 4, including the step of providing a protective sheet of material between the constructional part and the wrapped wire to protect the constructional part during said soldering of the wrapped wire.

6. A method according to claim 3, including the step of controlling the stress on the wire as it is being wound on the constructional part and simultaneously forming the non-circular cross-section of the wire during the winding step.

* * * * *